Sept. 10, 1968   A. M. LOCKIE ET AL   3,401,058
METHOD OF COATING ELECTRICAL CONDUCTORS
Filed Oct. 16, 1964
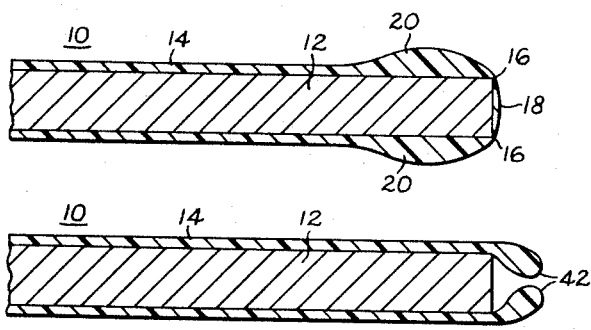
FIG.1.
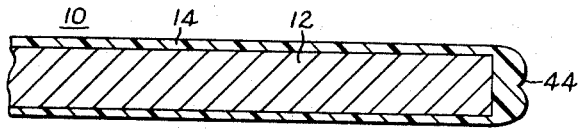
FIG.2.
FIG.3.
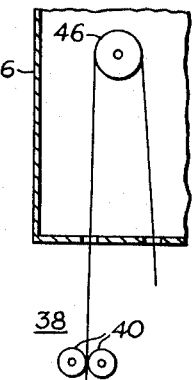
FIG.4A.
FIG.4B.
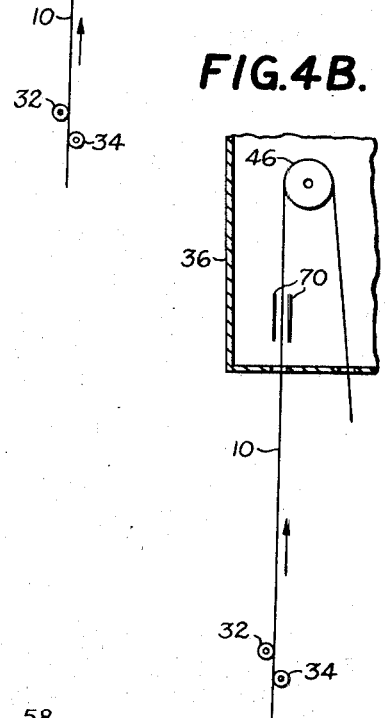
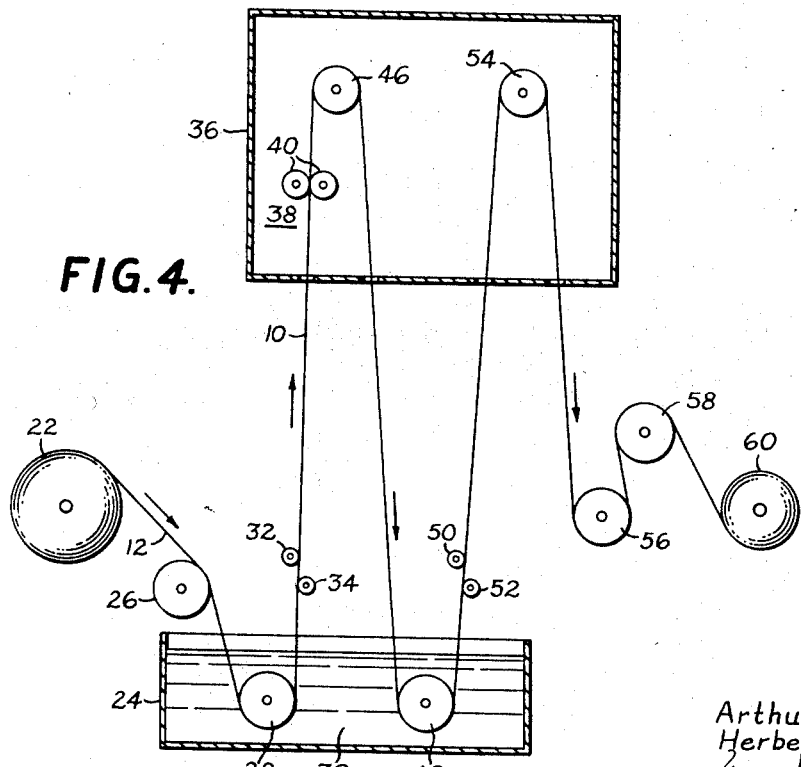
FIG.4.
INVENTORS
Arthur M. Lockie &
Herbert W. Book
BY
Donald R. Lackey
ATTORNEY

United States Patent Office 3,401,058
Patented Sept. 10, 1968

3,401,058
METHOD OF COATING ELECTRICAL
CONDUCTORS
Arthur M. Lockie, Hickory Township, Sharpsville, and Herbert W. Book, Hickory Township, Sharon, Pa., assignors to Westinghouse Electric Corporation, East Pittsburgh, Pa., a corporation of Pennsylvania
Filed Oct. 16, 1964, Ser. No. 404,326
7 Claims. (Cl. 117—232)

ABSTRACT OF THE DISCLOSURE

A method of coating electrically conductive strip or foil with a uniform coating of electrical insulation. The beads of liquid insulation which form near the edges of the strip material after liquid insulation is applied thereto, due to surface tension, are squeezed to force the insulation back to the edges of the strip. The insulation about the edges of the strip is maintained in this position until it is cured to the point necessary to overcome the surface tension.

---

The coating of metallic foil or strip, such as copper or aluminum, with a resinous electrical insulating material presents many difficult problems. One of the problems is in getting the resinous insulation to adequately coat the edges of the strip conductor. The surface tension of the resinous insulation causes it to pull away from the edges of the strip after being applied and results in an inadequate coating of electrical insulation at this point. The pulling back or flowing of the resinous insulation from the edges of the strip conductor causes another problem, a build-up or bead of resinous insulation near the edge of the strip. Since the coated strip conductor is subsequently wound into a large number of superimposed turns to form an electrical winding for electrical apparatus, such as transformers, it is important that the strip conductor have a uniform thickness. If the bead is not removed from the strip conductor, it would not be suitable for use in an electrical winding because of the winding shape would be distorted, with the winding dimension building up faster at the edges of the strip than at its center portion.

In order to overcome these problems the strip conductor may be cut to width after coating, therefore cutting off the edges and the bead of insulation. The coated strip may then be etched to remove a portion of the metallic strip at the edge, leaving the insulating coating overhanging the edges of the strip. The strip conductor may then be given another coating of resinous insulation, which fills in the space between the overhanging edges of the insulation. This process produces satisfactory results, but it would be desirable if the slitting operation subsequent to the coating of the strip, the etching operation after slitting, and the recoating operation after etching, could be eliminated.

Since the voltage from the edges of the strip material to ground will generally be many times the voltage between adjacent turns, it would also be desirable to provide more insulation on the edges of the strip material than on its flat surfaces.

Accordingly, it is an object of this invention to provide a new and improved method for coating metallic strip with electrical insulation.

Another object of the invention is to provide a new and improved method for coating metallic strip with an electrical insulating material which provides a substantially uniform coating across the strip.

A further object of the invention is to provide a new and improved method for coating metallic strip material with a resinous electrical insulating material which provides an adequate coating thickness at the edges of the strip.

Another object of the invention is to provide a new and improved method for coating metallic strip material with a resinous electrical insulating material which provides a greater build-up of insulating material on the edges of the strip material than on its flat surfaces.

Briefly, the present invention accomplishes the above cited objects by utilizing the excess coating material which forms into the undesirable bead near the edges of the strip, to coat the edges of the strip. The strip is coated with the electrical insulating material by some suitable method, such as in a dip tank, with the excess insulation forming near the edges of the strip. At a predetermined point during the curing cycle, when the coating is "semi-cured," the strip is passed through rolls shaped to squeeze the bead of insulation towards the edge of the strip and around the edge itself. This simultaneously removes the unwanted bead of insulation and edge-coats the strip. The steps of slitting, etching and recoating the edge of the strip have thus been eliminated.

Another embodiment of the invention involves heating the rolls which are used to evenly distribute the coating around the edges of the strip, semi-curing the coating with the heat from the rolls, to a point where it will remain around the edge of the strip without tendency to flow or pull back from the edges. The coating may then be cured to its final solid stage in a conventional curing tower or oven.

Still another embodiment of the invention evenly distributes the coating on the strip and around its edges without physically contacting the strip itself. Electrodes connected to a suitable source of electrical potential are disposed adjacent the strip while the strip is being subjected to heat for curing the coating of the strip. These electrodes set up an electrostatic field which concentrates at the edges of the strip to attract the excess coating contained in the bead along the edges of the strip. The electrostatic field attracts and holds the excess insulation around the edge of the strip until the coating has reached a point during its cure cycle where it will remain at the edges of the strip without tendency to pull away.

In all of these embodiments, the insulation build-up on the edges of the strip is greater than on its flat surfaces, providing increased protection from the edges of the strip to ground.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings in which:

FIGURE 1 is a cross sectional view of coated metallic strip illustrating how the coating of insulation pulls back away from the edge of the strip to form a bead, and leave the edge of the strip with an inadequate coating of insulation;

FIG. 2 is a cross sectional view of coated metallic strip illustrating how the insulation contained in the bead shown in FIG. 1 may be squeezed out over the edge of the strip;

FIG. 3 is a cross sectional view of coated metallic strip illustrating how the insulation squeezed from the bead forms an edge coating;

FIG. 4 diagrammatically illustrates a method of coating metallic strip material according to one embodiment of the invention;

FIG. 4A diagrammatically illustrates another embodiment of the invention; and

FIG. 4B diagrammatically illustrates still another embodiment of the invention.

Referring now to the drawings, and FIG. 1 in particular, there is shown a cross sectional view of a coated metallic strip 10, including a metallic strip 12 of electrically conductive material having a coating of electrical insulation 14 disposed on both sides thereof. It is to be understood that the word "strip" as used throughout the specification and claims also includes the metallic conductor sometimes designated as "foil."

In general, the metallic strip 12, which may be copper, aluminum, or any other conductor of electricity, will have a thickness in the range of .001 to 0.10 inch, and the thickness of the insulating coating 14 will range from a uniform thickness of .0001 inch to .0015 inch on a side. It will be obvious, however, that the invention will apply to metallic strip of any dimension having any practical coating thickness. The width of the strip will depend upon the requirement of the application for which the strip is to be used.

The electrical insulation 14 which coats the metallic strip 12 may be any one of a variety of resinous coatings, such as the epoxys, polyesters, or silicones, or any other electrical insulation coating material. United States Patent 2,991,326, assigned to the same assignee as the present application, describes in detail the preparation of suitable epoxy resin coatings.

The coated metallic strip 10, shown in FIG. 1, illustrates some of the problems encountered when applying electrical insulating coatings to metallic strip. The surface tension of the coating 14 in its liquid form causes the coating to pull or flow away from edges 16 of the strip, leaving the edges 16 exposed, or with an insufficient coating thickness. The coating 18 between the edges 16 may also have a thickness insufficient to provide the dielectric strength required.

Another problem is presented by the build-up of the coating caused by the pulling away of the coating from the edges 16, which causes a bead 20 to be formed adjacent the edges 16 of the strip material 12. In order to form uniform electrical windings of strip material, it is essential that the coating thickness be substantially uniform across the strip. The bead 20, occurring at substantially the same location on the strip 12, causes an additive build-up in the winding at that location because of the large number of turns that are superimposed in most electrical windings. For example, a bead that is only .0005 inch thicker on a side than of the remainder of the coating will cause an electrical winding comprising 500 turns to be .5 inch thicker at the location of the bead than elsewhere in the winding. This non-uniformity in an electrical winding is undesirable. In order to eliminate the bead 20, the strip 12 is usually cut to width after coating, eliminating the portion of the strip 12 containing the bead. The coated metallic strip 12 is then etched to remove a small portion of the bare metal at the edges of the strip, and the coated metallic strip is then recoated with electrical insulation to fill in the opening caused by the removing of the metal during the etching process. While this process is successful, it would be desirable to eliminate the steps of slitting the strip to width after coating, etching the strip after slitting, and recoating after etching.

These steps may be eliminated by coating the strip 12 according to the teachings of this invention. In general, this invention discloses a method of coating metallic strip which includes the steps of applying a liquid coating to the strip and then distributing the liquid coating to uniformly cover the strip, including the edges. The liquid coating is maintained around the edges of the strip while the coating is cured or solidified. The strip may then have one or more additional coatings applied thereto which are cured after each application, in order to achieve the desired build-up or coating thickness.

More specifically, FIG. 4 diagrammatically illustrates an embodiment of the invention in which metallic strip 12 is unwound from a storage reel 22 and electrical insulating material in liquid form is applied to the strip. One method of applying the electrical insulating material to the strip is by dipping the strip into the liquid insulation and removing the excess insulation by wiping means. The strip is guided into and passed through a tank or reservoir 24 by suitably disposed guides or rollers 26 and 28. Reservoir 24 contains coating material 30 in liquid form, which adheres to the strip 12. After the coating material 30 is applied to the strip 12, the strip 12 is passed through wiping means, which may be in the form of grooved die pins 32 and 34, which wipe or remove any excess coating material 30 from the strip 12 and evenly distributes the coating material 30 across the strip to form a coating 14. As hereinbefore described, however, a bead 20 of coating material forms adjacent the edges 16 of the strip material 12 as the strip material 12 leaves the die pins 32 and 34. The strip material 12 is then drawn into a baking oven or curing tower 36, which heats the coated strip 10 to cure the coating 14 to its solid state. A typical range of oven temperatures for curing epoxy coatings is from 200 to 250° C. Instead of allowing the coating 14 to completely cure to its solid state, however, in this embodiment of the invention, squeezing or rolling means 38 are disposed within the tower 36 to squeeze the coated strip and distribute the excess coating 14 over the edges of the strip 12. Rolling means 38 is placed within the tower 36 so that the coating 14 will be partially cured, but still in its tacky state. The rolls 40, which are included in rolling means 38, are treated, such as with polytetrafluoroethylene, to prevent the coating 14 from adhering to the rolls 40. The rolls 40 are adjusted to squeeze the excess coating 14 contained in the bead 20 out over the edge of the strip 12, as shown at 42 in FIG. 2. The excess coating 14, as shown at 42 in FIG. 2, will then be further squeezed to cause its two portions to join as shown in FIG. 3, providing a permanent edge coating 44 possessing a high dielectric strength and good mechanical strength. The build-up 44 on the edges of the strip 12 is inherently greater than the build-up on the flat surfaces of the strip.

The coated strip 10 may then be given a plurality of subsequent dip and cure cycles to build-up the insulation coating 14 to the desired thickness. More specifically, the coated strip 10 may then be drawn over guide 46, into the tank 24 past guide 48, through die pins 50 and 52, to remove the excess coating material 30, into bake oven or curing tower 36, and then past guides 54 back into the tank 24 for another coating, similar to the first two dips shown in FIG. 4, and finally through rolls 56 and 58 to take-up reel 60.

Another embodiment of the invention involves moving the rolling means 38 to a location between the die or wiping pins 32 and 34, and the baking tower 36, as shown in FIG. 4A, and heating the rolls 40. The rolls 40 move and distribute the excess material located in the bead 20 to the edge of the strip and simultaneously partially cure the coating 14, by virtue of the heat in the heated rolls, to a degree which allows the coating to be maintained at the edges 16. The remainder of the process cycle may be as shown in FIG. 4, and hereinbefore described.

Still another embodiment of the invention accomplishes the removal of the bead 20 and coating of the edges 16 without physically contacting the coated strip 10. Electrodes 70 are disposed within the curing tower 36, as shown in FIG. 4B, and are connected to a high voltage power supply. The electrodes 70 are disposed to cause the electrostatic field set up by them to concentrate at the edges 16 of the coated strip 10, attracting and distributing the excess coating material from the bead 20 to the edge of the coated strip 10 and holding it there until the coating 12 cures to a sufficient degree to permanently hold its location. The remainder of the process cycle may be as shown in FIG. 4, and hereinbefore described.

In summary, there has been disclosed new and improved methods of coating metallic strip with electrical insulation, which simultaneously solves the bead problem and the problem of lack of insulation at the edges of the strip. The methods disclosed herein eliminate the steps of slitting, etching, and recoating the edges of the strip, as the excess material is moved from the bead to the edges of the strip while it is still in its tacky state, and held there until it has sufficient viscosity to maintain its position at the edges of the strip. One embodiment accomplishes the coating by dipping the strip into a solution of liquid electrical insulating material, removing the excess insulating material from the strip, squeezing the insulating material which forms a bead near the edge of the strip so that it moves over the edge of the strip, heating the strip to cure the electrical insulation to form a solid, which provides a uniform coating of electrical insulation on the metallic strip, including the edges of the strip. This first embodiment requires the squeezing of the metallic strip and the coating of insulation to be accomplished in the curing or baking tower when the insulating coating is partially cured. Another embodiment of the invention squeezes the bead to the edges of the strip with heated rolls before it proceeds to the curing tower, partially curing the coating from the heat provided by the squeezing or rolling means, to the point in the cure cycle of the insulation where it will permanently maintain its position at the edges of the strip. Still another embodiment of the invention involves the method of dipping the metallic strip into a solution of liquid electrical insulating material, removing or wiping the excess insulating material from the strip, electrostatically charging the coated strip to attract the bead solution to the edges of the strip, and heating the electrostatically charged strip to cure the coating to its solid state.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:

1. A method of uniformly coating metallic strip materal comprising the steps of applying a liquid electrical insulating material to a metallic strip, removing any excess liquid electrical insulating material from said metallic strip, curing said liquid electrical insulating material to form a solid coating on said metallic strip, and squeezing said metallic strip and the electrical insulating material disposed thereon during the curing of said electrical insulating material when said electrical insulating material reaches a tacky stage to force the electrical insulating material which flows away from the edges of said metallic strip during its liquid stage to permanently coat the edges of said metallic strip.

2. A method of uniformly coating metallic strip material comprising the steps of applying a liquid electrical insulating material to a metallic strip, removing any excess liquid electrical insulating material from said metallic strip, curing said liquid electrical insulating material to form a solid coating on said metallic strip, squeezing said metallic strip and the electrical insulating material disposed thereon during the curing of said electrical insulating material when said electrical insulating material reaches a tacky stage to force the electrical insulating material which flows away from the edges of said metallic strip during its liquid stage to permanently coat the edges of said metallic strip, applying one or more additional coatings of electrical insulating material to said metallic strip to obtain the desired thickness of electrical insulating material, removing any excess electrical insulating material from said metallic strip after each additional coating, and curing said electrical insulating material after each additional coating.

3. A method of uniformly coating metallic strip material comprising the steps of applying a liquid electrical insulating material to a metallic strip, removing any excess liquid insulating material from said metallic strip, squeezing said metallic strip and the electrical insulating material disposed thereon to force the insulating electrical material which flows away from the edges of said metallic strip while in its liquid stage to coat the edges of said metallic strip, heating said electrical insulating material while it is being squeezed to partially cure said electrical insulating material to a stage which causes said electrical insulating material to adhere to the edges of said metallic strip, and curing said electrical insulating material to its final solid stage.

4. A method of uniformly coating metallic strip material suitable for use in electrical windings, comprising the steps of applying a liquid electrical insulating material to a metallic strip, removing any excess liquid electrical insulating material from said metallic strip, charging said metallic strip electrostatically to attract to the edges of said metallic strip any liquid electrical insulating material which pulls away from the edges of said metallic strip, and solidifying said electrical insulating material while said metallic strip is being charged electrostatically to provide a metallic strip having a solid coating of electrical insulating material thereon, including its edges.

5. A method of uniformly coating metallic strip material comprising the steps of passing metallic strip through a reservoir containing liquid electrical insulating material, wiping said metallic strip to remove any excess liquid electrical insulating material, curing said liquid electrical insulating material to form a solid coating on said metallic strip, squeezing said metallic strip and the electrical insulating material disposed thereon during the curing of said electrical insulating material when said electrical insulating material reaches a tacky stage to force any electrical insulating material which flows away from the edges of said metallic strip during its liquid stage to permanently coat the edges of said metallic strip, passing said metallic strip through said reservoir one or more additional times, wiping said metallic strip after each additional pass to remove any excess liquid electrical insulating material, and curing said liquid electrical insulating material after each additional pass to obtain a metallic strip having a solid coating of electrical insulating material of predetermined thickness disposed thereon.

6. A method of uniformly coating metallic strip material comprising the steps of passing a metallic strip through a reservoir containing liquid electrical insulating material, wiping said metallic strip to remove any excess electrical insulating material, squeezing said metallic strip and the electrical insulating material disposed thereon to force any liquid insulating material which flows away from the edges of said metallic strip to coat the edges of said metallic strip, heating said electrical insulating material while it is being squeezed to partially cure said said electrical insulating material to a stage which causes said electrical insulating material to adhere to the edges of said metallic strip, curing said electrical insulating material to its solid stage, passing said metallic strip through said reservoir one or more additional times, wiping said metallic strip after each pass to remove any excess liquid electrical insulating material, and curing said liquid electrical insulating material after each additional pass to obtain a metallic strip having a substantially uniform solid coating of electrical insulating material of predetermined thickness disposed thereon.

7. A method of uniformly coating metallic strip material comprising the steps of passing metallic strip through a reservoir containing liquid electrical insulating material, wiping said metallic strip to remove any excess liquid electrical insulating material from said metallic strip, charging said metallic strip electrostatically to attract to the edges of said metallic strip liquid electrical insulating material which pulled away from the edges of said metallic strip due to surface tension, curing said electrical insulating material while said metallic strip is being charged electrostatically to provide a metallic strip having a solid coating of electrical insulating material thereon including its edges, passing said metallic strip through said reservoir one or more additional times, wiping said metallic strip after each pass to remove any excess liquid insulating material, and curing said liquid electrical insulating material after each additional pass to obtain a metallic strip having a solid coating of electrical insulating material of predetermined thickness disposed thereon.

References Cited

UNITED STATES PATENTS

| | | | |
|---|---|---|---|
| 2,526,763 | 10/1950 | Miller | 117—93.4 X |
| 2,760,884 | 8/1956 | Graf | 117—63 X |
| 2,994,624 | 8/1961 | Lit et al. | 117—232 |
| 3,019,126 | 1/1962 | Bartholomew | 117—93.4 X |
| 3,068,119 | 12/1962 | Gotsch | |

ALFRED L. LEAVITT, *Primary Examiner.*

C. K. WEIFFENBACH, *Assistant Examiner.*